United States Patent
Kondo et al.

(10) Patent No.: US 10,044,278 B2
(45) Date of Patent: Aug. 7, 2018

(54) POWER CONVERSION DEVICE

(71) Applicant: Mitsubishi Electric Corporation, Chiyoda-ku (JP)

(72) Inventors: Ryota Kondo, Chiyoda-ku (JP); Takaaki Takahara, Chiyoda-ku (JP); Satoshi Murakami, Chiyoda-ku (JP); Masaki Yamada, Chiyoda-ku (JP); Naohisa Uehara, Chiyoda-ku (JP); Hidehiko Kinoshita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/129,945

(22) PCT Filed: Mar. 6, 2015

(86) PCT No.: PCT/JP2015/056612
§ 371 (c)(1),
(2) Date: Sep. 28, 2016

(87) PCT Pub. No.: WO2015/174123
PCT Pub. Date: Nov. 19, 2015

(65) Prior Publication Data
US 2017/0179836 A1    Jun. 22, 2017

(30) Foreign Application Priority Data

May 15, 2014 (JP) .................. 2014-101080

(51) Int. Cl.
*H02M 3/335* (2006.01)
*H02M 1/42* (2007.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 1/4208* (2013.01); *H02M 2001/0009* (2013.01)

(58) Field of Classification Search
CPC ............ H02M 3/22; H02M 3/24; H02M 3/28; H02M 3/325; H02M 3/335;
(Continued)

(56) References Cited

U.S. PATENT DOCUMENTS

| 5,940,280 A | 8/1999 | Murai et al. |
| 2007/0047276 A1 | 3/2007 | Lin et al. |

(Continued)

FOREIGN PATENT DOCUMENTS

| CN | 1924648 A | 3/2007 |
| JP | 11-55950 A | 2/1999 |

(Continued)

OTHER PUBLICATIONS

International Search Report dated May 19, 2015 in PCT/JP2015/056612 filed Mar. 6, 2015.
(Continued)

*Primary Examiner* — Timothy J Dole
*Assistant Examiner* — Carlos Rivera-Perez
(74) *Attorney, Agent, or Firm* — Oblon, McClelland, Maier & Neustadt, L.L.P.

(57) ABSTRACT

This power conversion device includes a rectification circuit, a reactor, an inverter circuit, and an isolation transformer. The inverter circuit is composed of a first leg A, a second leg B, and a DC capacitor connected in parallel between DC buses. A first AC end of the first leg A is connected to a positive DC terminal of the rectification circuit via the reactor. High power factor control of current iac flowing from an AC power supply via the rectification circuit is performed by PWM control for the first leg A, and voltage Vdc of the DC capacitor is controlled by PWM control for the second leg B using a duty cycle equal to or smaller than that for the first leg A, thereby controlling power outputted to the secondary side of the isolation transformer.

10 Claims, 18 Drawing Sheets

(58) Field of Classification Search
CPC ........... H02M 3/33507; H02M 3/3353; H02M
3/33538; H02M 3/33546; H02M 3/33553;
H02M 3/337; H02M 3/3376; H02M
3/33515; H02M 3/33523; H02M 3/156;
H02M 3/158; H02M 1/08; H02M 1/0058;
H02M 1/083; H02M 1/088; H02M 1/42;
H02M 1/4208; H02M 1/4233; H02M
1/4258; H02M 2001/0009; H02M
2001/0032; H02M 2001/0074; H02J 7/02;
H02J 7/04; Y02B 40/90; Y02B 70/10;
Y02B 70/12; Y02B 70/123; Y02B
70/126; Y02B 70/14; Y02B 70/1458;
Y02B 70/1475; Y02B 70/1491
USPC ... 363/15–26, 34, 35, 37, 40–48, 74, 95–99,
363/123–127, 131–134; 323/205–211,
323/222–226, 235, 266, 271–275,
323/282–288, 351; 320/103, 104, 108,
320/137–145, 166
See application file for complete search history.

(56) References Cited

U.S. PATENT DOCUMENTS

2009/0196082 A1* 8/2009 Mazumder ............ H02M 5/458
363/132
2011/0292703 A1* 12/2011 Cuk .................... H02M 1/4258
363/126
2012/0300502 A1* 11/2012 Shimada ............. H02M 1/4258
363/17
2012/0307529 A1* 12/2012 Chiba .................... H02M 1/08
363/17

FOREIGN PATENT DOCUMENTS

| JP | 11-243646 A | 9/1999 |
| JP | 2007-68396 A | 3/2007 |
| JP | 2012-50264 A | 3/2012 |

OTHER PUBLICATIONS

Office Action dated Sep. 12, 2017 in Japanese Patent Application No. 2016-519137 (with partial English translation).
Japanese Office Action dated Apr. 4, 2017 in Patent Application No. 2016-519137 (with English translation).
Japanese Office Action dated Dec. 5, 2017 in Japanese Patent Application No. 2016-519137 with English translation.
Chinese Office Action dated Feb. 13, 2018 in Chinese Patent Application No. 201580012417.2 with computer generated English translation.

* cited by examiner

POWER CONVERSION DEVICE

TECHNICAL FIELD

The present invention relates to a power conversion device that performs power conversion of input from an AC power supply and supplies desired power to the secondary side of an isolation transformer.

BACKGROUND ART

In recent years, a one-stage conversion method has been proposed in which power factor control of input AC current and output power control are achieved at the same time in one power conversion device. As a conventional power conversion device of one-stage conversion type, a converter circuit for charger will be described below.

The converter circuit for charger is provided with: a half-bridge rectification circuit composed of two diodes; a capacitor connected in parallel to both ends of the half-bridge rectification circuit; a full-bridge circuit composed of four switch elements and formed by connecting, in parallel, both ends of a first half-bridge circuit composed of two switch elements (1) and (2) and a second half-bridge circuit composed of two switch elements (3) and (4), to both ends of the capacitor; a reactor provided between one end of an AC power supply the other end of which is connected to the connection point between the switch elements in the first half-bridge circuit, and the connection point between the diodes in the half-bridge rectification circuit; a primary coil of a high-frequency transformer connected between the connection points between the switch elements in the first and second half-bridge circuits; four drive circuits connected to the four switch elements; and a control circuit, thus forming a primary circuit of a converter. The control circuit performs ON/OFF control alternately for a group of the switch elements (1) and (4) and a group of the switch elements (2) and (3) in the full-bridge circuit composed of the four switch elements.

Further, a full-bridge rectification circuit connected in parallel to a secondary coil of the high-frequency transformer, and a capacitor connected in parallel to both ends of the full-bridge rectification circuit, form a secondary circuit of the converter, which rectifies high-frequency power generated by the primary circuit and charges a battery (for example, see Patent Document 1).

CITATION LIST

Patent Document

Patent Document 1: Japanese Laid-Open Patent Publication No. 11-243646

SUMMARY OF THE INVENTION

Problems to be Solved by the Invention

In such a conventional power conversion device, the two half-bridge circuits of the full-bridge circuit are controlled synchronously at the same duty cycle. Therefore, if high power factor control of input current is performed, DC capacitor voltage of the full-bridge circuit may deviate from the operation range, thereby causing a problem that overvoltage is applied to the power conversion device or a ripple component in output current further increases.

The present invention has been made to solve the above problem, and an object of the present invention is to provide a power conversion device that can achieve high power factor control of input current and output power control at the same time with high reliability.

Solution to the Problems

A power conversion device according to the present invention includes: a rectification circuit having a plurality of diodes with a full-bridge configuration and rectifying input from an AC power supply; a reactor connected to a DC terminal of the rectification circuit; an inverter circuit; an isolation transformer; and a control circuit for performing output control of the inverter circuit. In the inverter circuit, a first leg having a first switching element and a second switching element connected in series to each other with a connection point therebetween as a first AC end, a second leg having a third switching element and a fourth switching element connected in series to each other with a connection point therebetween as a second AC end, and a DC capacitor are connected in parallel between DC buses, the first AC end is connected to a positive DC terminal of the rectification circuit, and a negative one of the DC buses is connected to a negative DC terminal of the rectification circuit. The isolation transformer has a primary winding and a secondary winding, and the first AC end and the second AC end of the inverter circuit are connected to respective ends of the primary winding.

The control circuit performs high power factor control of circuit current flowing from the AC power supply via the rectification circuit, by PWM control for the first leg, and controls voltage of the DC capacitor by PWM control for the second leg using a duty cycle equal to or smaller than a duty cycle for the first leg, thereby controlling power outputted to a secondary side of the isolation transformer.

Effect of the Invention

The power conversion device according to the present invention can achieve high power factor control of input current and output power control at the same time with high reliability.

DESCRIPTION OF EMBODIMENTS

Embodiment 1

Figure 1:
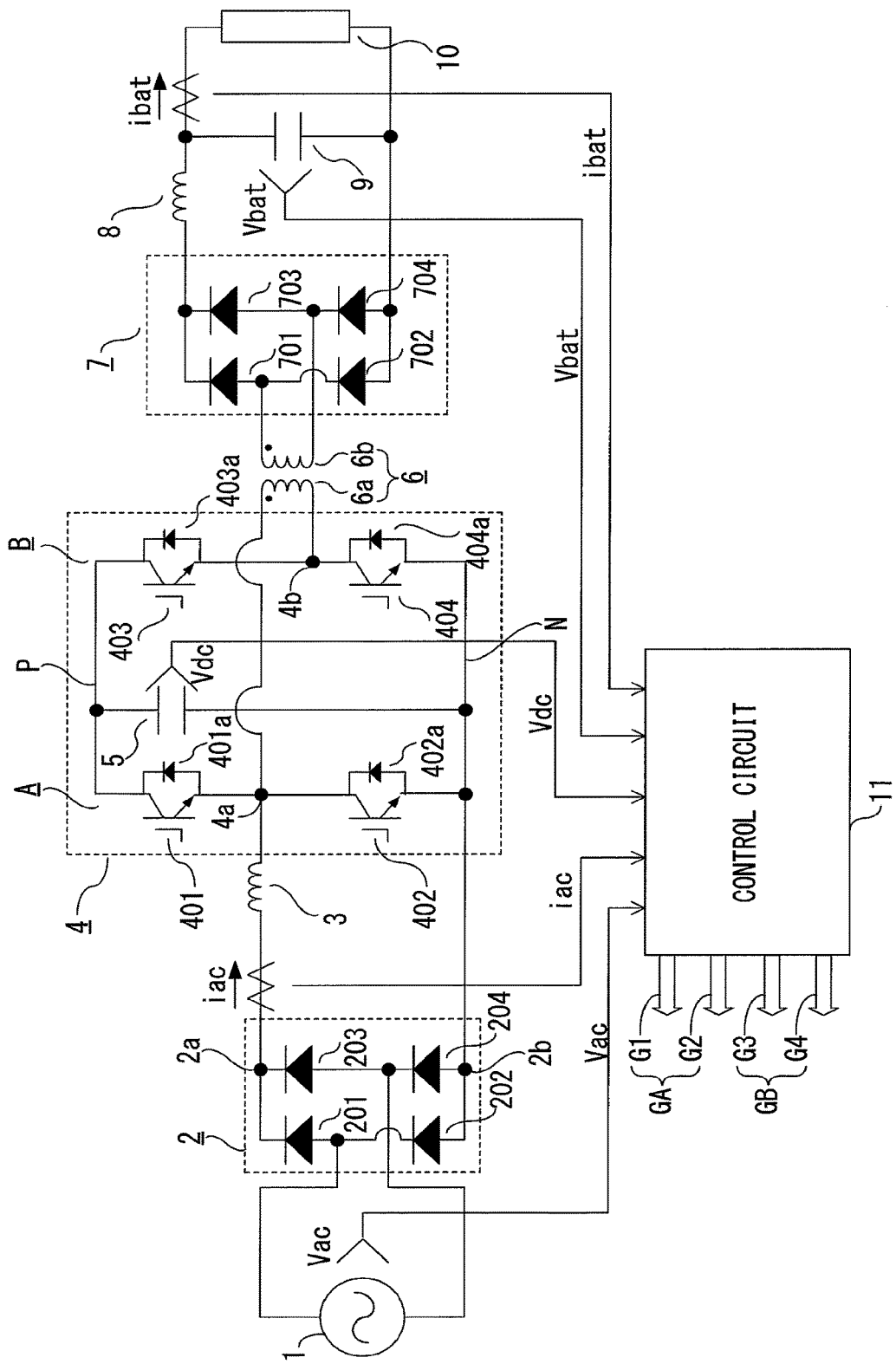
FIG. 1 is a diagram showing the configuration of a power conversion device according to embodiment 1 of the present invention.

Hereinafter, a power conversion device according to embodiment 1 of the present invention will be described. FIG. 1 is a schematic configuration diagram of the power conversion device according to embodiment 1 of the present invention.

As shown in FIG. 1, the power conversion device includes: a main circuit for converting AC power of an AC power supply 1 to DC power and outputting the DC power to a battery 10 which is a DC circuit; and a control circuit 11.

The main circuit includes: a rectification circuit 2 for rectifying input from the AC power supply 1; a reactor 3 as a current limiting circuit; an inverter circuit 4; an isolation transformer 6; a second rectification circuit 7; a smoothing reactor 8 as a second reactor; and a smoothing capacitor 9.

The rectification circuit 2 is a diode rectification circuit composed of four diodes 201 to 204 with a full-bridge configuration. The inverter circuit 4 is a full-bridge inverter circuit in which a first leg A having a first switching element 401 and a second switching element 402 connected in series to each other with a connection point therebetween as a first AC end 4a, a second leg B having a third switching element 403 and a fourth switching element 404 connected in series to each other with a connection point therebetween as a second AC end 4b, and a DC capacitor 5 are connected in parallel between DC buses (P and N buses).

In this case, the second rectification circuit 7 is a diode rectification circuit composed of four diodes 701 to 704 with a full-bridge configuration, but may be another rectification type using a diode or a rectification type using an active element.

The isolation transformer 6 has a primary winding 6a and a secondary winding 6b, the first AC end 4a and the second AC end 4b of the inverter circuit 4 are connected to both ends of the primary winding 6a, and AC terminals of the second rectification circuit 7 are connected to both ends of the secondary winding 6b.

On the primary side of the isolation transformer 6, output of the AC power supply 1 is connected to AC terminals of the rectification circuit 2, and a positive DC terminal 2a of the rectification circuit 2 is connected to the first AC end 4a of the inverter circuit 4 via the reactor 3. A negative DC terminal 2b of the rectification circuit 2 is connected to a negative DC bus (hereinafter, N bus) of the inverter circuit 4.

On the secondary side of the isolation transformer 6, the smoothing capacitor 9 is connected in parallel to the battery 10, a first DC output terminal of the second rectification circuit 7 is connected to a first terminal of the smoothing capacitor 9 via the smoothing reactor 8, and a second DC output terminal of the second rectification circuit 7 is connected to a second terminal of the smoothing capacitor 9.

The first to fourth switching elements 401 to 404 are formed of IGBTs (Insulated Gate Bipolar Transistors) to which diodes 401a to 404a are connected in antiparallel, respectively.

Instead of IGBTs, the first to fourth switching elements 401 to 404 may be semiconductor switching elements such as MOSFETs (Metal Oxide Semiconductor Field Effect Transistors) in which diodes are included between the sources and drains. In the case of using MOSFETs, the included diodes may be used as the diodes 401a to 404a.

Although the reactor 3 is connected to the positive DC terminal 2a of the rectification circuit 2, the reactor 3 may be connected to the negative DC terminal 2b, or may be connected in a distributed manner to both the positive DC terminal 2a and the negative DC terminal 2b of the rectification circuit 2.

Instead of the battery 10, the DC circuit may be a DC load that needs to be isolated from input from the AC power supply 1, and for example, may be composed of an electric double-layer capacitor or the like.

In addition, voltage sensors are provided for detecting voltage Vac of the AC power supply 1, voltage Vdc of the DC capacitor 5, and voltage Vbat of the smoothing capacitor 9, respectively, and current sensors are provided for detecting current iac as circuit current flowing from the AC power supply 1 via the rectification circuit 2, and charge current (DC current) ibat for the battery 10. In this case, current flowing through the reactor 3 is detected as the current iac.

The control circuit 11 receives the detected DC capacitor voltage Vdc, smoothing capacitor voltage Vbat, AC power supply voltage (AC voltage) Vac, current iac, and charge current ibat. On the basis of these values, the control circuit 11 performs high-frequency PWM control to generate gate signals G1 to G4 for the first to fourth switching elements 401 to 404, thereby performing output control of the inverter circuit 4. At this time, the control circuit 11 generates a gate signal GA (G1, G2) for the first leg A so that the input power factor from the AC power supply 1 becomes substantially 1, that is, so as to perform high power factor control for the current iac, and generates a gate signal GB (G3, G4) for the second leg B so that voltage Vdc of the DC capacitor 5 becomes target voltage Vdc*, thereby turning on and off the first to fourth switching elements 401 to 404 to perform output control of the inverter circuit 4.

The operation of the power conversion device configured as described above, i.e., operation of outputting DC power to the battery 10 will be described below.

Figure 2:
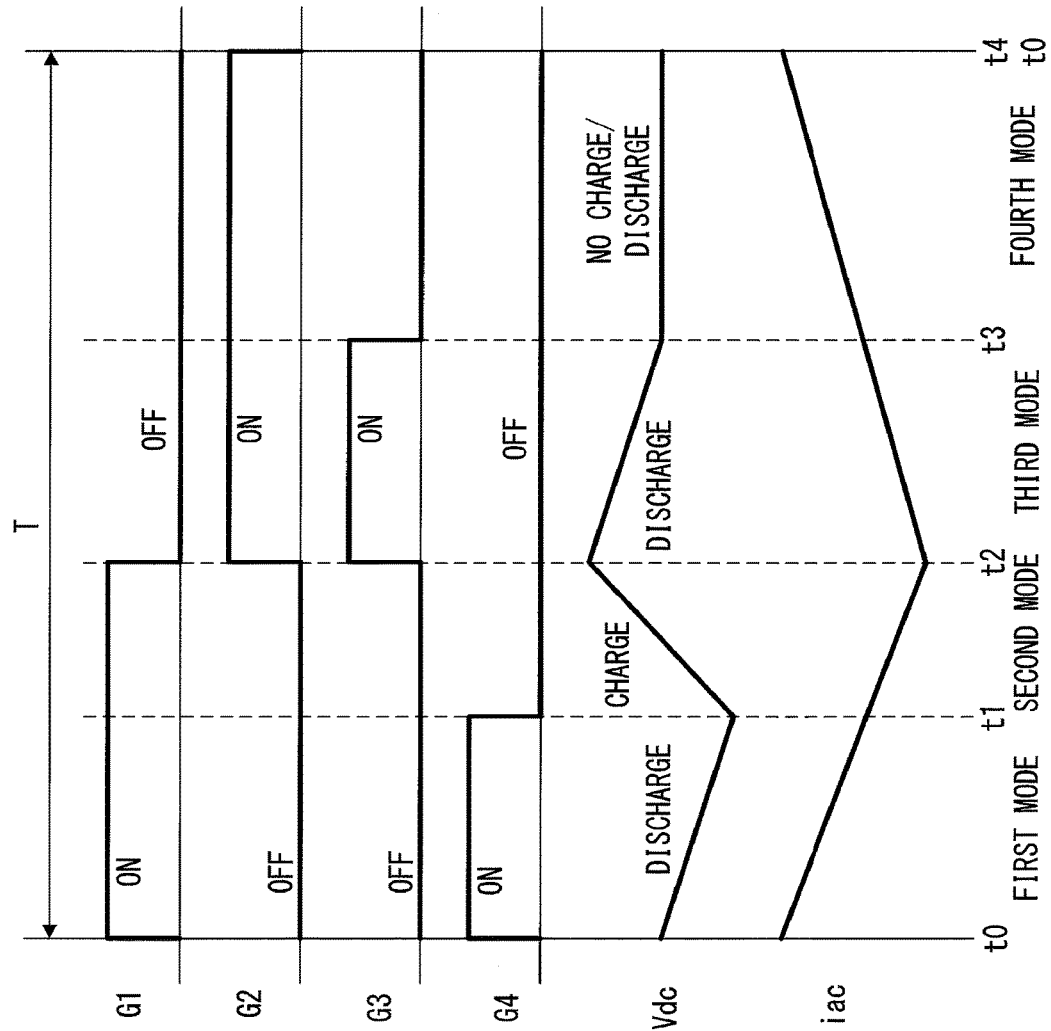
FIG. 2 is a diagram showing waveforms of gate signals and waveforms at several sections, for explaining operation of the power conversion device according to embodiment 1 of the present invention.

FIG. 2 is a diagram showing the gate signals G1 to G4 for the first to fourth switching elements 401 to 404, current iac, and voltage Vdc of the DC capacitor 5. For voltage Vdc of the DC capacitor 5, target voltage Vdc* is set to be higher than peak voltage Vp of voltage Vac of the AC power supply 1, and the voltage Vdc is controlled to be higher than the peak voltage Vp.

Since voltage Vac from the AC power supply 1 is full-wave rectified by the rectification circuit 2, operation is performed at a frequency twice as high as the AC frequency. The first and second switching elements 401 and 402 in the first leg A operated by the gate signals G1 and G2 are subjected to PWM control, thereby controlling the current iac so that the amount of input current from the AC power supply 1 becomes constant and the input power factor becomes substantially 1. The third and fourth switching elements 403 and 404 in the second leg B operated by the gate signals G3 and G4 are controlled so as to adjust the amount of power supplied to the battery 10 and the charge/discharge amount of the DC capacitor 5 so that voltage Vdc of the DC capacitor 5 becomes constant target voltage Vdc*. Hereinafter, controlling current iac so that the input power factor from the AC power supply 1 becomes substantially 1 is simply referred to as current control.

As shown in FIG. 2, the drive cycle of the first to fourth switching elements 401 to 404 is denoted by T, the drive cycle T can be divided into four periods of t0 to t1, t1 to t2, t2 to t3, and t3 to t4 (t0), and operation modes in these periods are defined as first to fourth modes.

At time t0 (=t4), the first switching element 401 operated by the gate signal G1 is turned on, and the second switching element 402 operated by the gate signal G2 is turned off. At this time, the fourth switching element 404 operated by the gate signal G4 is also turned on at the same time.

At time t1, the fourth switching element 404 is turned off.

At time t2, the first switching element 401 is turned off and the second switching element 402 is turned on. At this time, the third switching element 403 operated by the gate signal G3 is also turned on at the same time.

At time t3, the third switching element 403 is turned off.

FIG. 3 to FIG. 6 show current route diagrams for explaining operations in the operation modes during the respective periods. In the current route diagrams, current routes in the inverter circuit 4 are shown. In this case, current iac flowing to the reactor 3 flows from the AC power supply 1 via the rectification circuit 2 to the reactor 3, and then is inputted to the first AC end 4a of the inverter circuit 4.

Figure 3:
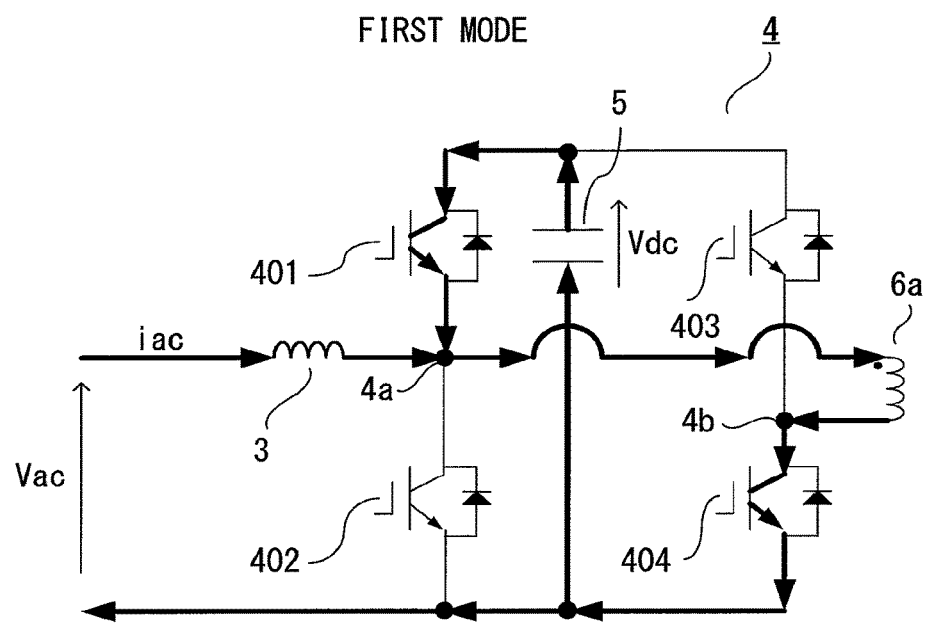
FIG. 3 is a current route diagram for explaining operation in a first mode of the power conversion device according to embodiment 1 of the present invention.

In the first mode during the period from t0 to t1, the first and fourth switching elements 401 and 404 are both ON, and current flows through the current route shown in FIG. 3. That is, current iac flowing through the reactor 3 flows to the primary winding 6a of the isolation transformer 6, and then returns to the input side via the fourth switching element 404. In addition, current flows from the DC capacitor 5 via the first switching element 401 to the primary winding 6a, and then returns to the DC capacitor 5 via the fourth switching element 404.

In the first mode, since the first switching element 401 is ON, the potential on the inverter circuit 4 side of the reactor 3 is fixed at voltage Vdc. Voltage Vdc of the DC capacitor 5 is controlled to be higher than peak voltage Vp of voltage Vac of the AC power supply 1, and current iac flowing through the reactor 3 decreases. In addition, since the DC capacitor 5 discharges current, voltage Vdc decreases.

Figure 4:
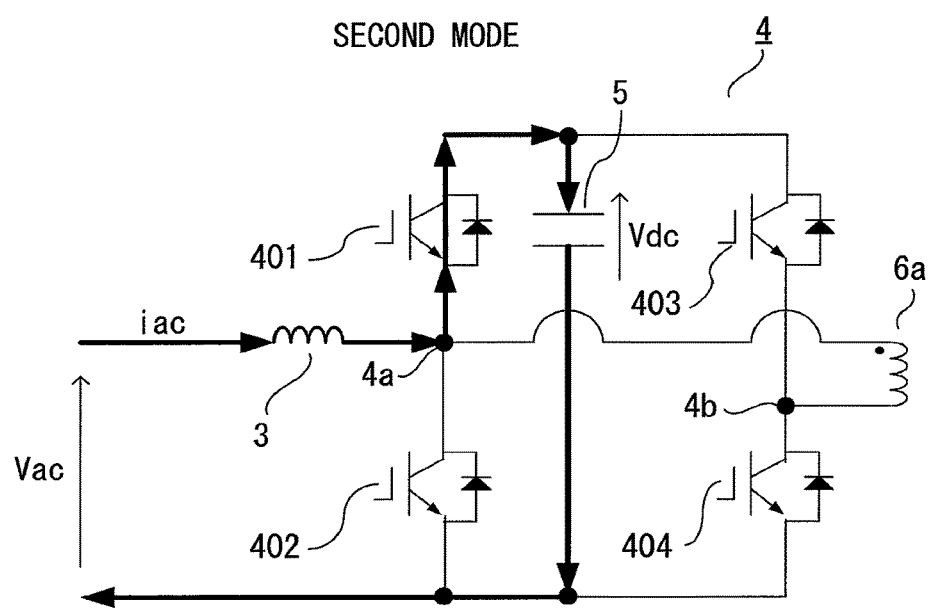
FIG. 4 is a current route diagram for explaining operation in a second mode of the power conversion device according to embodiment 1 of the present invention.

In the second mode during the period from t1 to t2, only the first switching element 401 is ON, and current flows through the current route shown in FIG. 4. That is, current iac flowing through the reactor 3 flows to the DC capacitor 5 via the first switching element 401. Since the second to fourth switching elements 402 to 404 are OFF, there is no current route other than the above one.

In the second mode, since the first switching element 401 is ON, the potential on the inverter circuit 4 side of the reactor 3 is fixed at voltage Vdc. Voltage Vdc of the DC capacitor 5 is controlled to be higher than peak voltage Vp of voltage Vac of the AC power supply 1, and current iac flowing through the reactor 3 decreases. In addition, since the DC capacitor 5 is charged with current, voltage Vdc increases.

Figure 5:
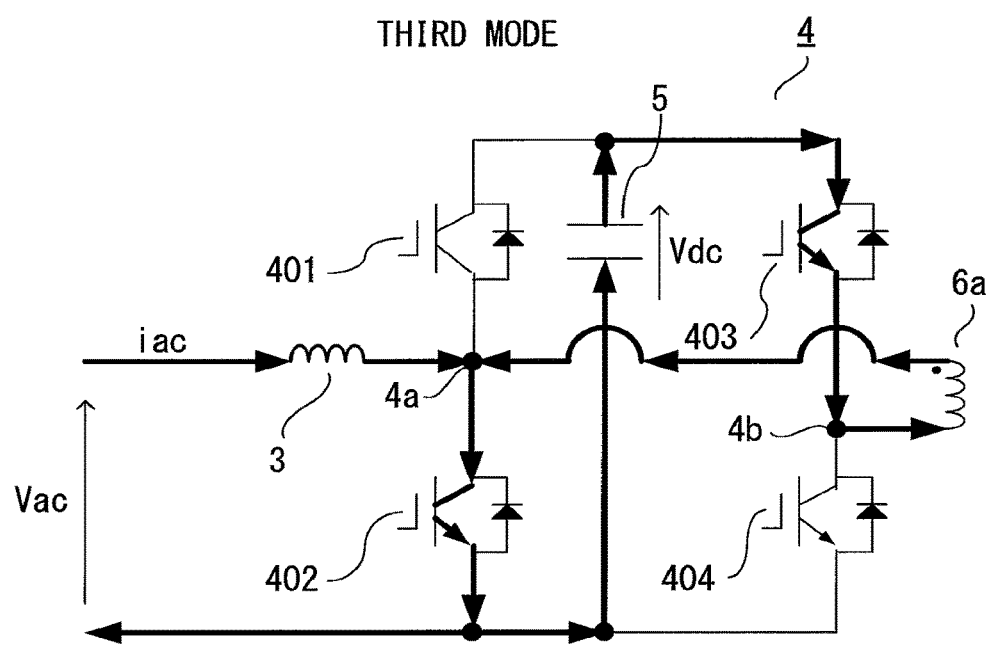
FIG. 5 is a current route diagram for explaining operation in a third mode of the power conversion device according to embodiment 1 of the present invention.

In the third mode during the period from t2 to t3, the second and third switching elements 402 and 403 are both ON, and current flows through the current route shown in FIG. 5. That is, current iac flowing through the reactor 3 flows back to the input side via the second switching element 402. In addition, current flows from the DC capacitor 5 via the third switching element 403 to the primary winding 6a, and then returns to the DC capacitor 5 via the second switching element 402.

In the third mode, since the second switching element 402 is ON, the potential on the inverter circuit 4 side of the reactor 3 is fixed at potential 0 of the N bus, and current iac flowing through the reactor 3 increases. In addition, since the DC capacitor 5 discharges current, voltage Vdc decreases.

Figure 6:
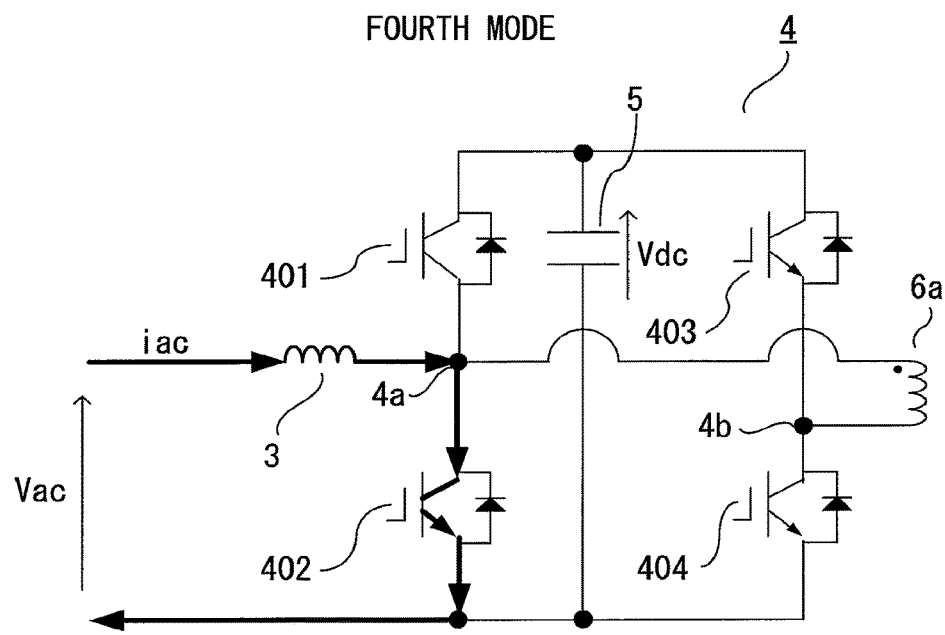
FIG. 6 is a current route diagram for explaining operation in a fourth mode of the power conversion device according to embodiment 1 of the present invention.

In the fourth mode during the period from t3 to t4 (=t0), only the second switching element 402 is ON, and current flows through the current route shown in FIG. 6. That is, current iac flowing through the reactor 3 flows back to the input side via the second switching element 402. Since the first, third, and fourth switching elements 401, 403, and 404 are OFF, there is no current route other than the above one.

In the fourth mode, since the second switching element 402 is ON, the potential on the inverter circuit 4 side of the reactor 3 is fixed at potential 0 of the N bus, and current iac flowing through the reactor 3 increases. In addition, since charge/discharge of current is not performed in the DC capacitor 5, voltage Vdc does not change.

In the first mode and the third mode, current flows through the isolation transformer 6, and the polarity of current flowing through the primary winding 6a is inverted between the first mode and the third mode. That is, AC current is inputted to the isolation transformer 6, AC power is converted to DC power by the second rectification circuit connected to the secondary winding 6b, the DC power is smoothed by the smoothing reactor 8 and the smoothing capacitor 9, and then the resultant power is supplied to the battery 10. Thus, in the first mode and the third mode, DC power is supplied to the battery 10.

Since currents having opposite polarities flow through the isolation transformer 6 in the first mode and the third mode, in order to suppress biased magnetization of the isolation transformer 6, the periods of the first mode and the third mode are set to be equal to each other. That is, control is performed so that the ON period of the fourth switching element 404 and the ON period of the third switching element 403 are equal to each other and the duty cycles thereof are equal to each other.

As shown in FIG. 2, the first switching element 401 and the second switching element 402 are controlled so that ON and OFF are inverted therebetween, current iac decreases during the ON period of the first switching element 401, and current iac increases during the ON period of the second switching element 402. By adjusting t2 in FIG. 2, i.e., adjusting the duty cycles of the first and second switching elements 401 and 402, increase/decrease in the current iac is adjusted, whereby the current control can be achieved.

The fourth switching element 404 has an ON period only within the ON period of the first switching element 401, and the third switching element 403 has an ON period only within the ON period of the second switching element 402. Voltage Vdc decreases during the ON periods of the third and fourth switching elements 403 and 404, and voltage Vdc increases during the period in which only the first switching element 401 is turned on. By adjusting t3 and t1 in FIG. 2, i.e., adjusting the duty cycles of the third and fourth switching elements 403 and 404, increase/decrease in voltage Vdc of the DC capacitor 5 is adjusted, whereby voltage Vdc is maintained at the target voltage Vdc*.

Thus, current control of current iac using the first and second switching elements 401 and 402 in the first leg A, and voltage control of voltage Vdc using the third and fourth switching elements 403 and 404 in the second leg B are respectively performed by using individual duty cycles, whereby current control and voltage control are achieved at the same time and DC power is supplied to the battery 10. The details of the current control and the voltage control will be described below.

First, t2 is a timing determined depending on the current control, and a duty cycle D1 which is the ON period (t0-t2) per drive cycle T of the first switching element 401 is represented by (Expression 1). In addition, a duty cycle D2 which is the ON period (t2-t4) per drive cycle T of the second switching element 402 is represented by (Expression 2). Here, vac is the voltage waveform of the AC power supply 1, and Vdc is voltage of the DC capacitor 5.

$$D1=vac/Vdc \quad \text{(Expression 1)}$$

$$D2=(Vdc-vac)/Vdc \quad \text{(Expression 2)}$$

The first and second switching elements 401 and 402 are driven with the duty cycles based on (Expression 1) and (Expression 2).

The fourth switching element 404 is turned on at the same time as the first switching element 401, the third switching element 403 is turned on at the same time as the second switching element 402, and the ON period (t0-t1) of the fourth switching element 404 and the ON period (t2-t3) of the third switching element 403 are equal to each other. Duty cycles D3 and D4 which are the ON periods per drive cycle T of the third and fourth switching elements 403 and 404 are represented by (Expression 3). Here, Vbat is voltage of the smoothing capacitor 9, N1 is the number of turns of the primary winding 6a of the isolation transformer 6, and N2 is the number of turns of the secondary winding 6b of the isolation transformer 6.

$$D3=D4=(½)·(Vbat/Vdc)·(N2/N1) \quad \text{(Expression 3)}$$

The fourth switching element 404 has an ON period only within the ON period of the first switching element 401, and the third switching element 403 has an ON period only within the ON period of the second switching element 402. Therefore, the duty cycles D3 and D4 are always smaller than the duty cycles D1 and D2, and the relationship among t0 to t4 is as follows.

$$t0 \le t1 \le t2,\ t2 \le t3 \le t4$$

Figure 7:
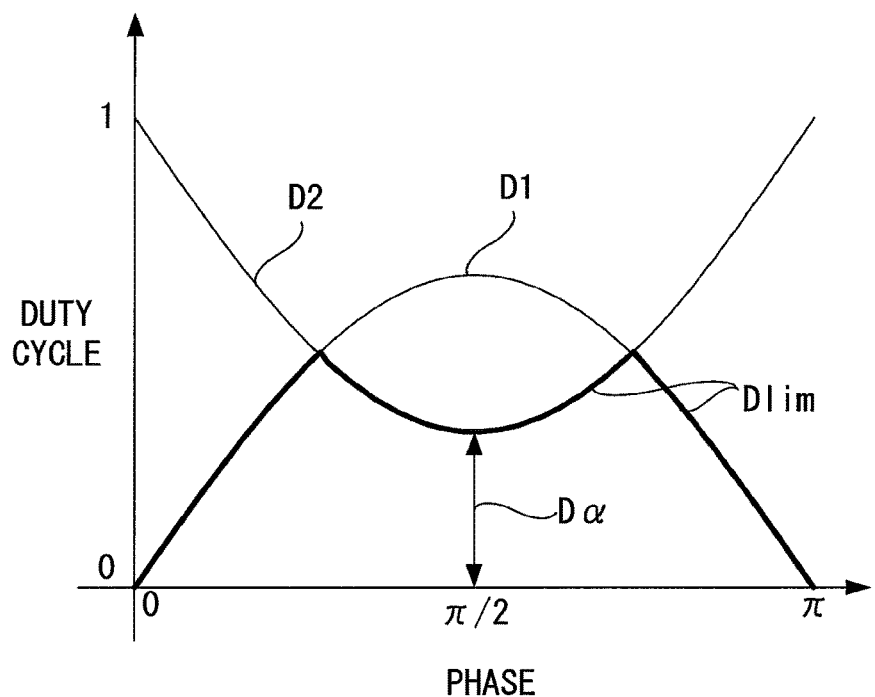
FIG. 7 is a diagram showing a duty cycle for a first leg according to embodiment 1 of the present invention.

FIG. 7 shows a schematic duty trajectory diagram of the duty cycles D1 and D2 for the first leg A, and shows Dlim which is an upper limit of the duty cycle D3 (D4) for the second leg B. Each point of Dlim is min(D1, D2) at the corresponding phase, that is, Dlim is the smaller one of the duty cycles D1 and D2.

As shown in FIG. 7, D1 becomes 0 at zero cross phases 0 and π of the AC voltage, and has a peak value at phase π/2. Therefore, in the vicinity of phases 0 and π, Dlim=D1. In this case, in the vicinity of phase π/2, D2<D1, and Dlim=D2.

A value Dα of Dlim at phase π/2 is represented by (Expression 4). Here, Vp is peak voltage of AC voltage Vac.

$$Dα=\min(Vp/Vdc,(Vdc-Vp)/Vdc) \quad \text{(Expression 4)}$$

By setting the duty cycle D3 (D4) to be smaller than Dlim, the periods of the first mode and the third mode, which are the periods during which current flows to the isolation transformer 6, are adjusted, and the control of voltage Vdc can be achieved. Here, the condition that allows the control of voltage Vdc, i.e., a control allowed condition is indicated by the following expression.

$$D3(D4)<Dα$$

That is, $$(½)·(Vbat/Vdc)·(N2/N1)<\min(Vp/Vdc,(Vdc-Vp)/Vdc) \quad \text{(Expression 5)}$$

Figure 8:
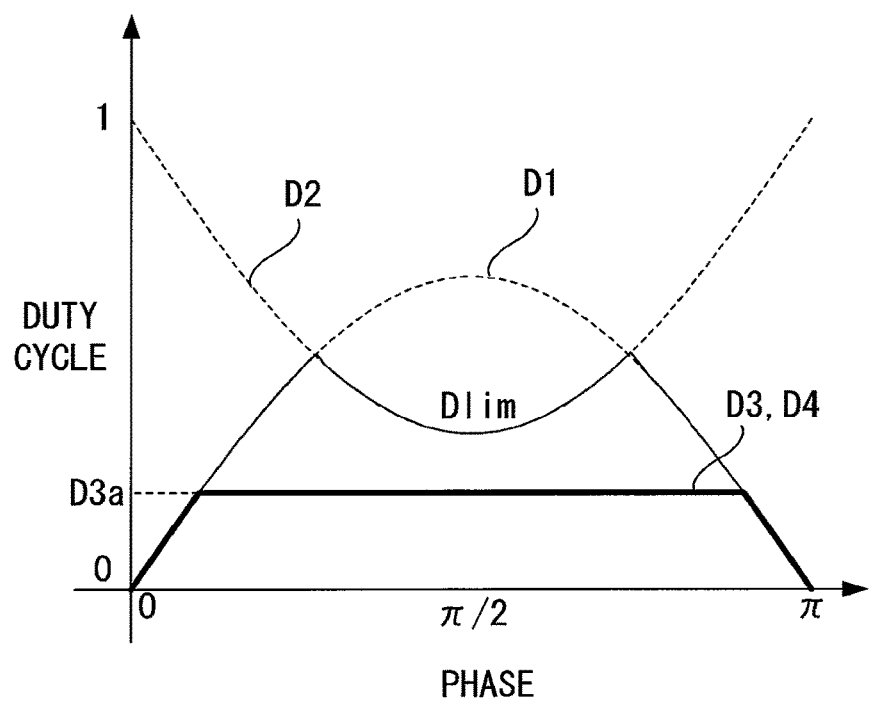
FIG. 8 is a diagram showing a duty cycle for a second leg according to embodiment 1 of the present invention.

FIG. 8 is a diagram showing the duty cycle D3 (D4) for the second leg B. In the case where the control allowed condition indicated by the above (Expression 5) is satisfied, the value of D3 (D4) calculated by (Expression 3) is set as a basic duty cycle D3a, and the following relationships are satisfied.

If $D3a<Dlim,\ D3(D4)=D3a$

If $D3a \ge Dlim,\ D3(D4)=Dlim$

In the vicinity of zero cross phases 0 and π of the AC voltage, Dlim is infinitely close to 0 in principle. Therefore, in the phase range in which the calculated value of D3 (D4) is equal to or greater than Dlim, D3 (D4) is set to the value of Dlim. In the other phase range, from the control allowed condition, D3 (D4) is smaller than Dlim. Thus, in the entire phase range, the duty cycle D3 (D4) can be made smaller than Dlim, and voltage Vdc can be controlled.

Thus, irrespective of the phase, the duty cycle D3 (D4) of the third and fourth switching elements 403 and 404 in the second leg B can be made smaller than the duty cycles D1 and D2 of the first and second switching elements 401 and 402 in the first leg A, and voltage Vdc can be controlled to be constant target voltage Vdc*. This voltage control is output power control in which the output power amount is controlled to control voltage Vdc.

Thus, the current control is performed by duty control for the first leg A, and the output power control is performed by duty control for the second leg B, that is, the current control and the output power control can be achieved by one inverter circuit 4 having a full-bridge configuration.

In general, in the case of a single-phase inverter connected to a single-phase grid, voltage pulsation having a frequency twice as high as the AC frequency is generated at the DC part. In the present embodiment, since charge and discharge of the DC capacitor 5 are performed within the drive cycle T of the inverter circuit 4, the generated voltage pulsation is based on the drive cycle T, and particularly, determined by the charge period in the second mode. Therefore, in the inverter circuit 4, the voltage pulsation having a frequency twice as high as the AC frequency is not generated, the capacitance of the DC capacitor 5 can be greatly reduced, and the DC capacitor 5 can be downsized.

In the AC power supply 1, voltage vac and current iac with power factor 1 are defined by (Expression 6) and (Expression 7). Power Pac of the AC power supply 1 is represented by (Expression 8). In the present embodiment, power Pac represented by (Expression 8) is fully transferred to the battery 10. When the battery 10 has constant voltage Vbat, current ibat supplied to the battery 10 is represented by (Expression 9), and has a pulsation component having a frequency twice as high as the AC frequency. Here, Vac and Iac are the voltage effective value and the current effective value of the AC power supply 1.

$$vac = (\sqrt{2})Vac \cdot \sin(\omega t) \quad \text{(Expression 6)}$$

$$iac = (\sqrt{2})Iac \cdot \sin(\omega t) \quad \text{(Expression 7)}$$

$$Pac = Vac \cdot Iac(1 - \cos(2\omega t)) \quad \text{(Expression 8)}$$

$$ibat = (Vac/Vbat) \cdot Iac(1 - \cos(2\omega t)) \quad \text{(Expression 9)}$$

Next, generation of command values for the duty cycles D1 to D4 for performing the current control and the voltage control will be described. Hereinafter, the command values for the duty cycles are referred to as duty commands.

Figure 9:
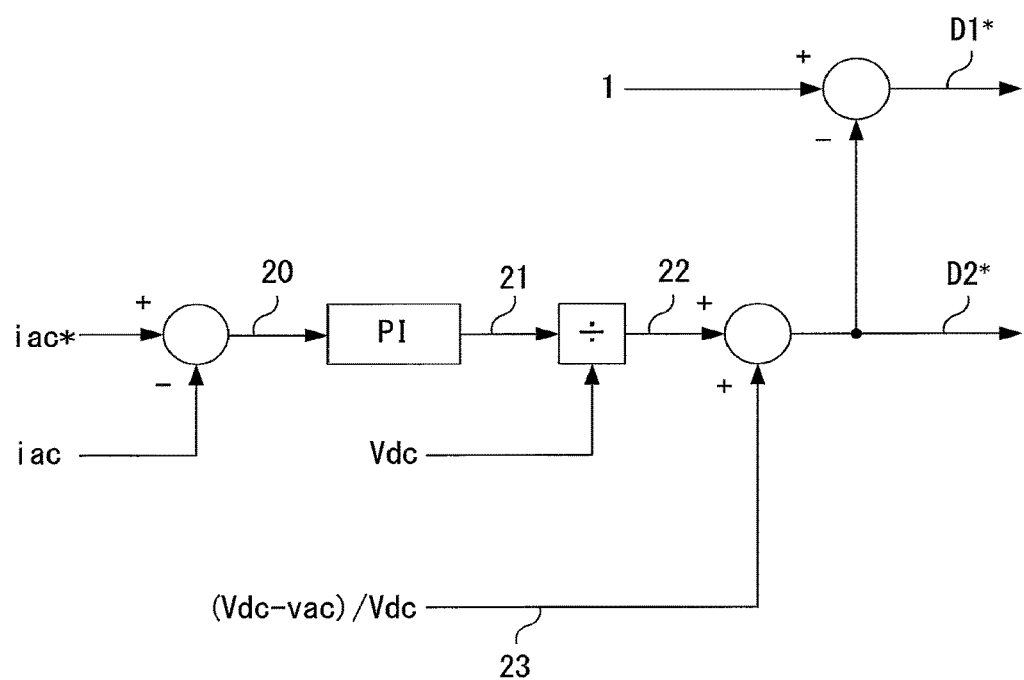
FIG. 9 is a control block diagram showing generation of a duty command for the first leg according to embodiment 1 of the present invention.

FIG. 9 is a control block diagram showing generation of the duty commands for the first leg A by the control circuit 11. D1* and D2* are duty commands for performing PWM control for the first and second switching elements 401 and 402. By the duty commands D1* and D2*, the amount of current from the AC power supply 1 is controlled and current iac is controlled so that the input power factor from the AC power supply 1 becomes substantially 1.

As shown in FIG. 9, using, as a feedback amount, a difference 20 between a current command (target sinewave current) iac* having a sinewave synchronized with voltage Vac of the AC power supply 1, and the detected current iac, PI control is performed, and the resultant output 21 is divided by voltage Vdc, thereby calculating a reference duty command 22 for the second switching element 402. Then, a feedforward term 23 is added to the reference duty command 22, to obtain the duty command D2* for the second switching element 402. The feedforward term 23 is (Vdc−vac)/Vdc represented by the above (Expression 2), and is determined in accordance with the phase of the AC power supply 1 in every drive cycle of the inverter circuit 4. A value obtained by subtracting the duty command D2* from 1 is used as the duty command D1* for the first switching element 401.

Figure 10:
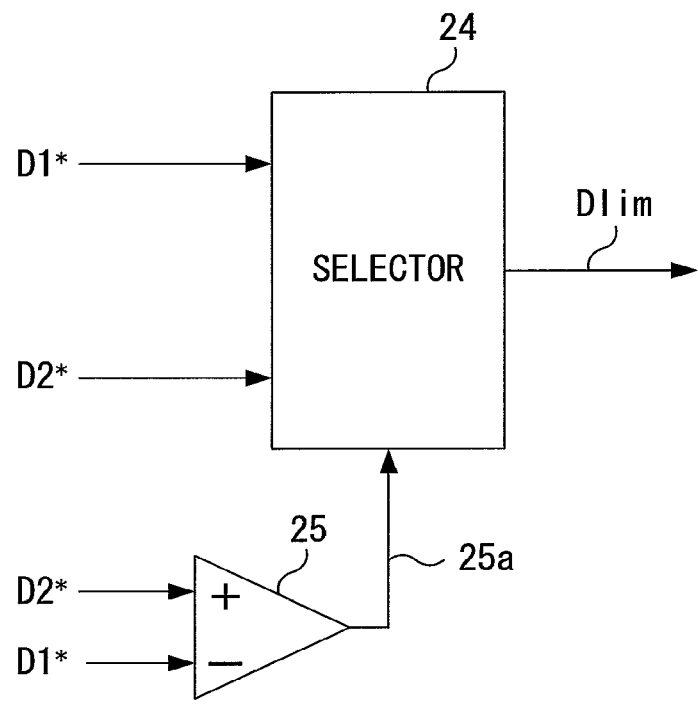
FIG. 10 is a control block diagram showing generation of a duty command upper limit for the second leg according to embodiment 1 of the present invention.

FIG. 10 is a control block diagram showing generation of Dlim which is the duty command upper limit for the second leg B. As shown in FIG. 10, D1* and D2* are inputted to a selector 24, and also inputted to a comparator 25. On the basis of a comparison signal 25a from the comparator 25, the selector 24 outputs one of D1* and D2* as Dlim.

When D2* is equal to or greater than D1*, the comparison signal 25a from the comparator 25 becomes H, and the selector 24 outputs D1* as Dlim. When D2* is smaller than D1*, the comparison signal 25a from the comparator 25 becomes L, and the selector 24 outputs D2* as Dlim.

Figure 11:
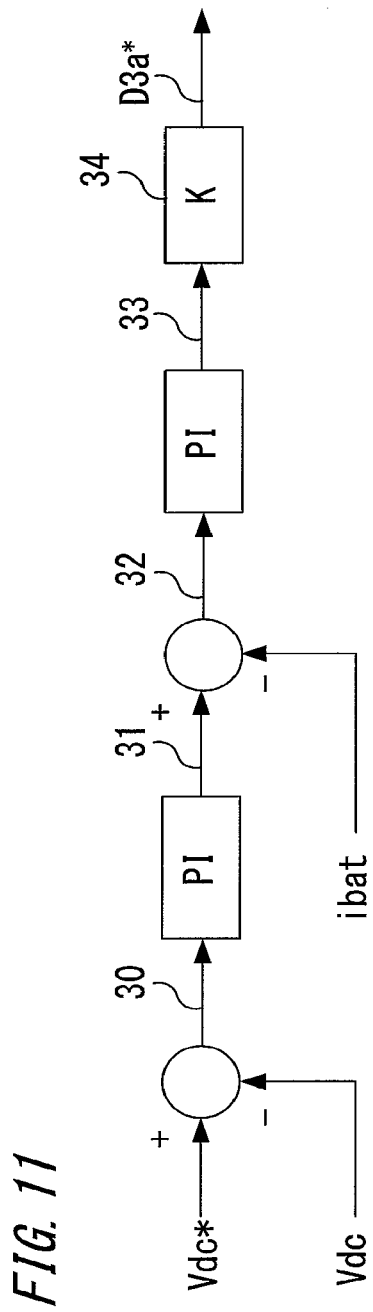
FIG. 11 is a control block diagram showing generation of a basic duty command for the second leg according to embodiment 1 of the present invention.

FIG. 11 is a control block diagram showing generation of the basic duty command for the second leg B. D3a* is a command value for the basic duty cycle D3a shown in FIG. 8, i.e., the basic duty command. The basic duty command D3a* is calculated so as to control the output power amount and maintain voltage Vdc at the target voltage Vdc*.

As shown in FIG. 11, using, as a feedback amount, a difference 30 between the target voltage Vdc* for the DC capacitor 5 and the detected voltage Vdc, PI control is performed, and the resultant output is used as an output current command value 31 for the battery 10. Using, as a feedback amount, a difference 32 between the output current command value 31 and the detected current ibat, PI control is performed, and the resultant output 33 is adjusted by a gain adjustor 34, thereby generating the basic duty command D3a*.

Figure 12:
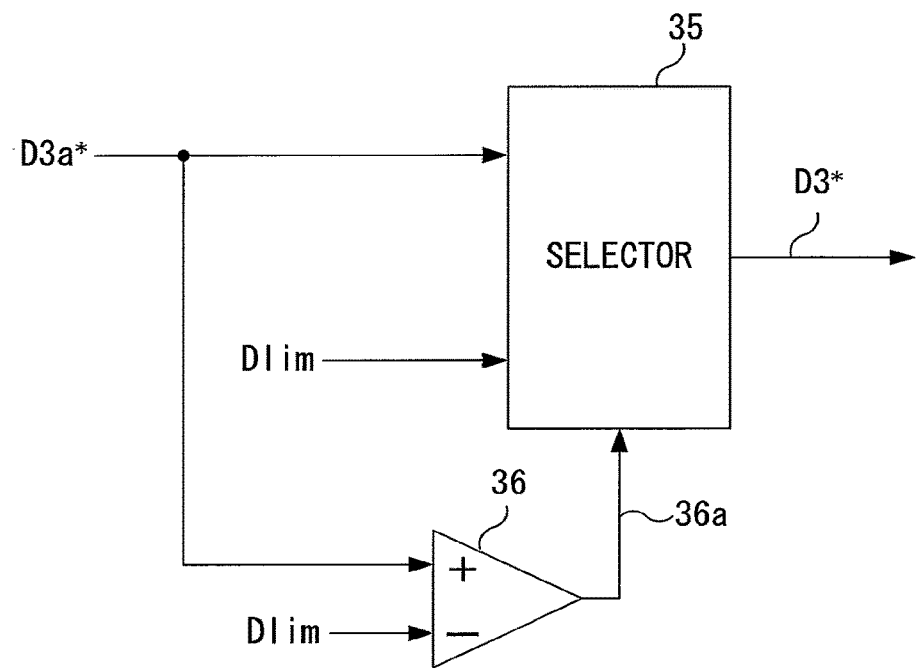
FIG. 12 is a control block diagram showing generation of a duty command for the second leg according to embodiment 1 of the present invention.

FIG. 12 is a control block diagram showing generation of a duty command for the second leg B. D3* (=D4*) is a duty command for performing PWM control for the third and fourth switching elements 403 and 404.

As shown in FIG. 12, the basic duty command D3a* and Dlim are inputted to a selector 35, and also inputted to a comparator 36. On the basis of a comparison signal 36a from the comparator 36, the selector 35 outputs one of D3a* and Dlim as D3*.

When D3a* is equal to or greater than Dlim, the comparison signal 36a from the comparator 36 becomes H, and the selector 35 outputs Dlim as D3*. When D3a* is smaller than Dlim, the comparison signal 36a from the comparator 36 becomes L, and the selector 35 outputs D3a* as D3*.

Figure 13:
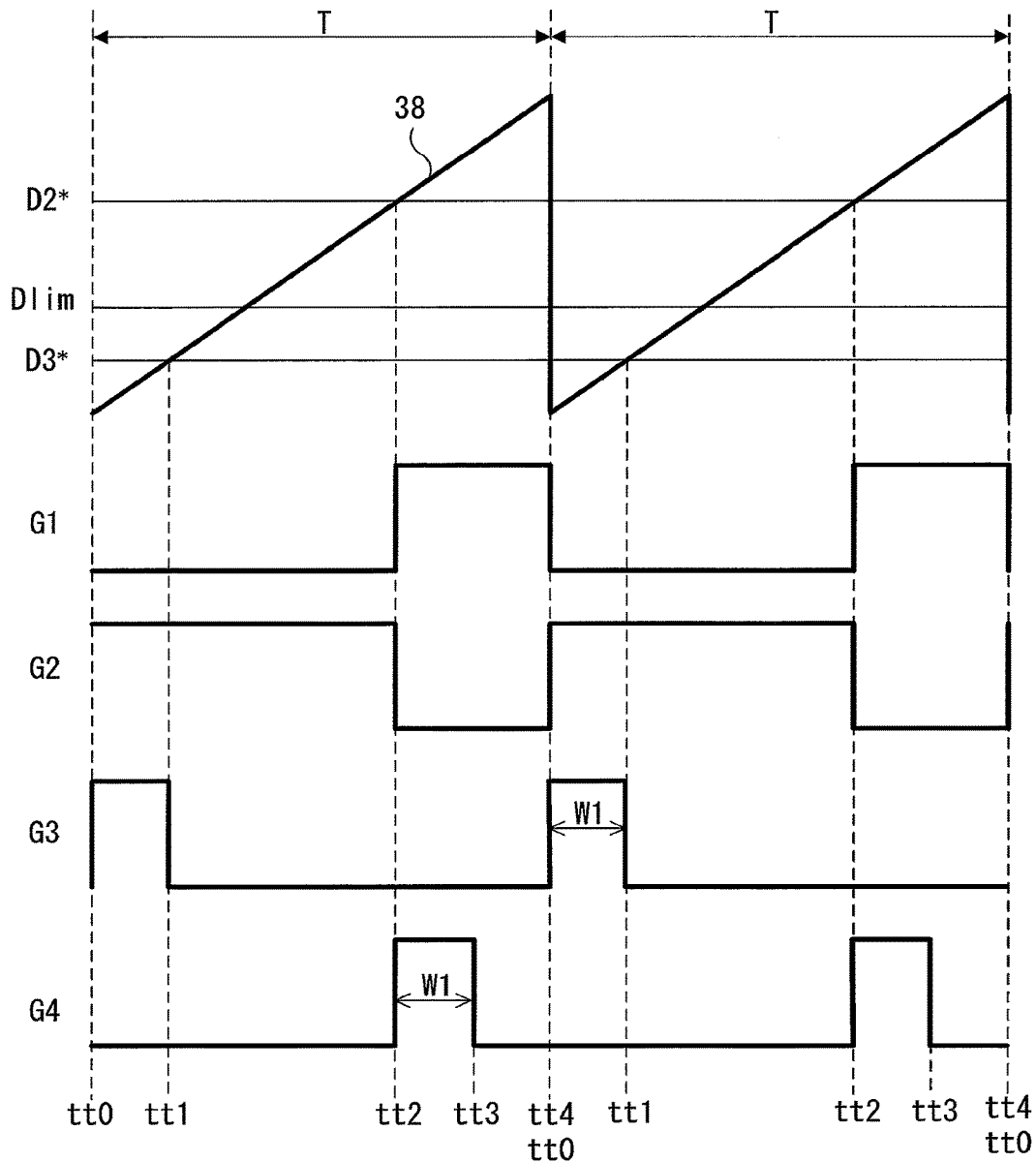
FIG. 13 is a waveform diagram for explaining generation of gate signals using a saw-tooth wave in the power conversion device according to embodiment 1 of the present invention.

Next, on the basis of FIG. 13 to FIG. 15, generation of the gate signals G1 to G4 for controlling the first to fourth switching elements 401 to 404 in the inverter circuit 4 will be described below. FIG. 13 is a waveform diagram for explaining generation of the gate signals G1 to G4, FIG. 14 is a control block diagram showing generation of the gate signals G1 and G2 for the first leg A, and FIG. 15 is a control block diagram showing generation of the gate signals G3 and G4 for the second leg B.

As shown in FIG. 13, the gate signals G1 to G4 are generated through PWM control using the duty commands for the first leg A and the second leg B, and a carrier wave. In this case, a saw-tooth wave 38 is used as the carrier wave. D2* is used as the duty command for the first leg A, and D3* (=D4*) is used as the duty command for the second leg B. The saw-tooth waves 38 used for generating the gate signals G1 to G4 are waveforms having the same phase and the same value.

Figure 14:
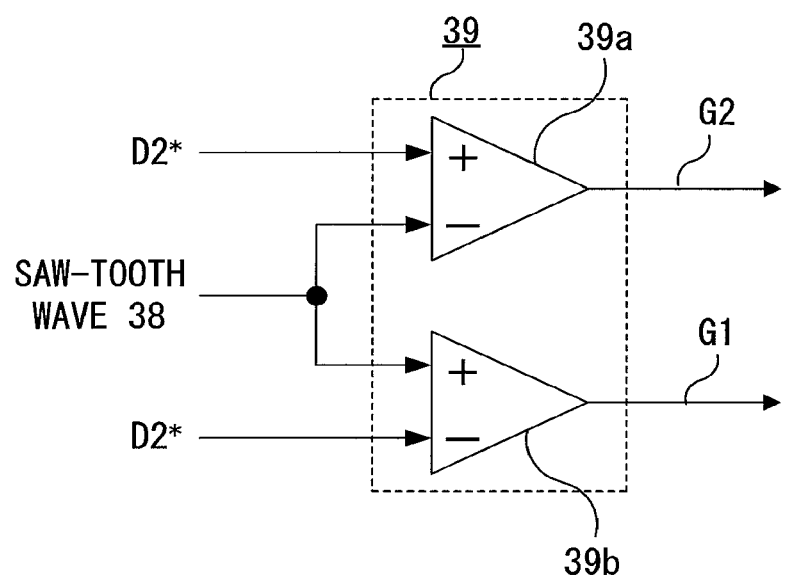
FIG. 14 is a control block diagram showing generation of gate signals for the first leg according to embodiment 1 of the present invention.
Figure 15:
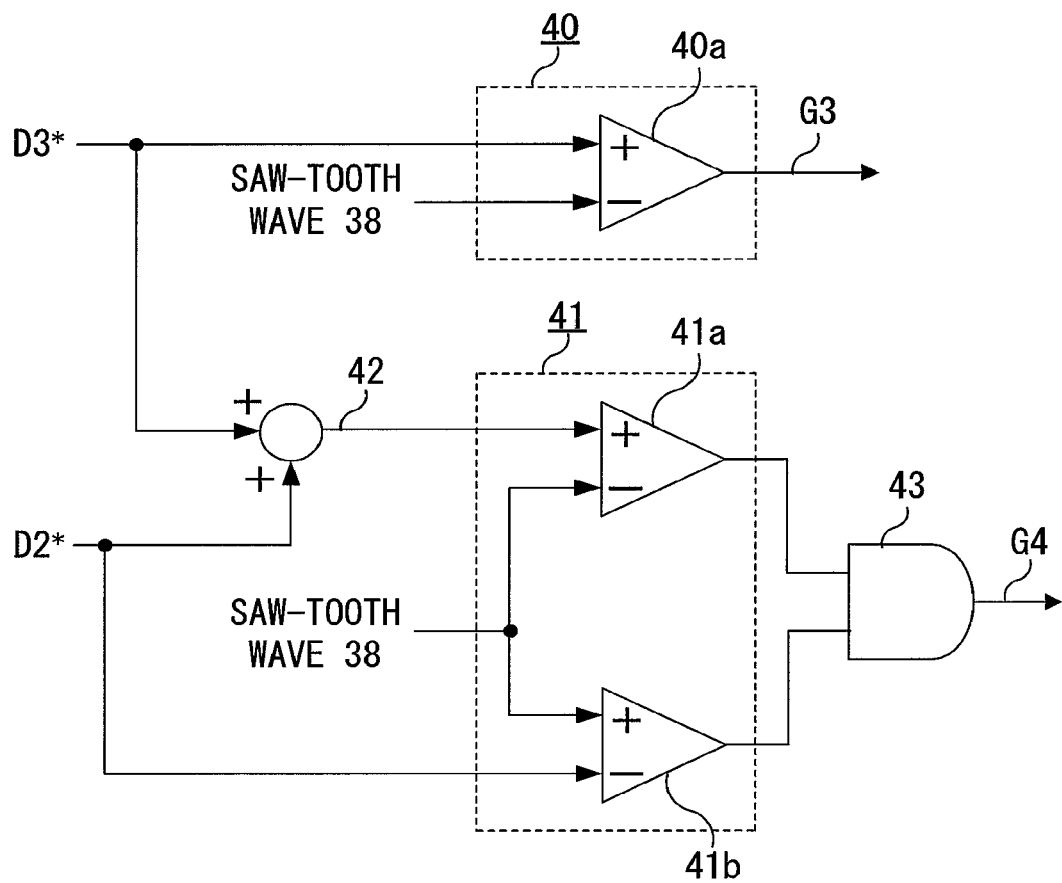
FIG. 15 is a control block diagram showing generation of gate signals for the second leg according to embodiment 1 of the present invention.

As shown in FIG. 14, a gate signal generator 39 for the first leg A includes two comparators 39a and 39b, each of which compares D2* and the saw-tooth wave 38, thereby generating the gate signals G2 and G1.

During a period (tt0 to tt2) in which D2* is equal to or greater than the value of the saw-tooth wave 38, the gate signal G2 becomes H and turns on the second switching element 402. During a period (tt2 to tt4 (=tt0)) in which the value of the saw-tooth wave 38 is equal to or greater than D2*, the gate signal G1 becomes H and turns on the first switching element 401.

As shown in FIG. 15, a gate signal generator 40 for generating the gate signal G3 for the second leg B includes one comparator 40a. The gate signal G4 is generated using a gate signal generator 41 including two comparators 41a and 41b, and an AND circuit 43.

In the gate signal generator 40 for generating the gate signal G3, the comparator 40a compares D3* and the saw-tooth wave 38, thereby generating the gate signal G3. During a period (tt0 to tt1) in which D3* is equal to or greater than the value of the saw-tooth wave 38, the gate signal G3 becomes H and turns on the third switching element 403. The gate signals G2 and G3 both rise at time tt0, that is, risings of their gate signal pulses are synchronized with each other.

In the gate signal generator 41, the comparator 41a compares a sum 42 of D2* and D3*, and the saw-tooth wave 38, and the comparator 41b compares the saw-tooth wave 38 and D2*. Comparison signals from the two comparators 41a and 41b are inputted to the AND circuit 43, and the AND circuit 43 generates a logical conjunction and outputs the gate signal G4. From a timing (tt2) at which the saw-tooth wave 38 becomes equal to or greater than D2*, the gate signal G4 becomes H within the pulse width W1 of the gate signal G3 based on D3*, and the fourth switching element 404 is turned on during the period (tt2 to tt3). The gate signals G1 and G4 both rise at time tt2, that is, risings of their gate signal pulses are synchronized with each other.

It is noted that tt0, tt1, tt2, and tt3 in FIG. 13 correspond to t2, t3, t4 (t0), t1 in FIG. 2. That is, the operation modes in the periods tt0 to tt1, tt1 to tt2, tt2 to tt3, and tt3 to tt4 (t0) are the third mode, the fourth mode, the first mode, and the second mode, respectively.

As described above, in the present embodiment, for the first leg A, the duty cycles D1 and D2 are adjusted and PWM control is performed, thereby performing high power factor control for current iac flowing from the AC power supply 1 via the rectification circuit 2, and for the second leg B, the duty cycle D3 (D4) is adjusted to be a value equal to or smaller than the duty cycles D1 and D2, and PWM control is performed, thereby controlling voltage Vdc of the DC capacitor 5 and controlling power outputted to the secondary side of the isolation transformer 6. Thus, the current control and the output power control can be achieved by one inverter circuit 4 having a full-bridge configuration, whereby the power conversion device can be simplified and downsized.

The control circuit 11 performs PWM control for the first leg A and the second leg B with equal drive cycles T synchronized with each other, generates the duty commands D1* and D2* for controlling the first leg A so that current iac becomes the current command iac* which is a target sinewave current, and generates the duty command D3* (D4*) for controlling the second leg B so that voltage Vdc of the DC capacitor 5 becomes the target voltage Vdc* which is higher than peak voltage Vp of the AC power supply 1. Thus, high power factor control of current iac and output power control for maintaining voltage Vdc at the target voltage Vdc* can be achieved with high reliability.

Since the duty cycles D3 and D4 for controlling the third and fourth switching elements 403 and 404 in the second leg B are controlled to be equal to each other, biased magnetization of the isolation transformer 6 is suppressed. The duty cycles D3 and D4 are limited using, as the upper limit Dlim, the smaller one of the duty cycles D1 and D2 for the first and second switching elements 401 and 402. Therefore, the fourth switching element 404 can be controlled so as to have an ON period only within the ON period of the first switching element 401, and the third switching element 403 can be controlled so as to have an ON period only within the ON period of the second switching element 402. Thus, the periods of charging and discharging of the DC capacitor 5 can be reliably controlled, and voltage Vdc can be reliably controlled to be the target voltage Vdc*.

In addition, the saw-tooth wave 38 is used as the carrier wave of PWM control for the first leg A and the second leg B, and the gate signals G1 to G4 are generated such that rising of a gate signal pulse for the first switching element 401 and rising of a gate signal pulse for the fourth switching element 404 are synchronized with each other, and rising of a gate signal pulse for the second switching element 402 and rising of a gate signal pulse for the third switching element 403 are synchronized with each other. Therefore, within the constraint condition due to the high power factor control, the duty cycle D3 (D4) for the second leg B can be freely adjusted, whereby the high power factor control and the output power control can be reliably achieved independently of each other, the quality of transmitted power is enhanced, and output control of the power conversion device with higher reliability can be achieved.

In the present embodiment, since charge and discharge of the DC capacitor 5 are performed within the drive cycle T of the inverter circuit 4, the generated voltage pulsation is based on the drive cycle T. Therefore, power pulsation that pulsates at a frequency twice as high as the AC power supply frequency caused by the AC power supply 1 is entirely transmitted to the battery 10 on the secondary side of the isolation transformer 6, and it is not necessary to address the power pulsation having a frequency twice as high as the AC power supply frequency by the DC capacitor 5. The DC capacitor 5 only needs to address the charge and discharge due to the drive cycle T of the inverter circuit 4, and thus size reduction can be achieved owing to great reduction in the capacitance.

In the above embodiment, the case where risings of gate signal pulses for the first and fourth switching elements 401 and 404 are synchronized, and risings of gate signal pulses for the second and third switching elements 402 and 403 are synchronized, has been shown. However, for both sets of the switching elements, fallings of the gate signal pulses may be synchronized.

A dead time for preventing short circuit may be provided for switching of the first and second switching elements 401 and 402 in the first leg A. Similarly, a dead time for preventing short circuit may be provided for switching of the third and fourth switching elements 403 and 404 in the second leg B.

Also in the case where the reactor 3 is connected to the negative DC terminal 2b, or in the case where the reactors 3 are connected in a distributed manner to both the positive DC terminal 2a and the negative DC terminal 2b of the rectification circuit 2, as in the above embodiment, PWM control is performed for the first leg A to perform the current control, and PWM control is performed for the second leg B to control voltage Vdc of the DC capacitor 5, whereby the same effect as in the above embodiment can be obtained.

In the above embodiment, the power conversion device has a configuration on the secondary side of the isolation transformer 6, i.e., the second rectification circuit 7, the smoothing reactor 8, and the smoothing capacitor 9. However, such a secondary-side circuit is not limited thereto. Such a secondary-side circuit may not be provided in the power conversion device and a configuration formed in another device may be connected.

Embodiment 2

Hereinafter, a power conversion device according to embodiment 2 of the present invention will be described. In the above embodiment 1, the saw-tooth wave 38 is used as the carrier wave of PWM control for the inverter circuit 4. In the present embodiment 2, a triangular wave is used as the carrier wave. In the power conversion device according to the present embodiment 2, the main circuit configuration and generation of the duty commands D1* to D4* are the same as those in the above embodiment 1.

Figure 16:
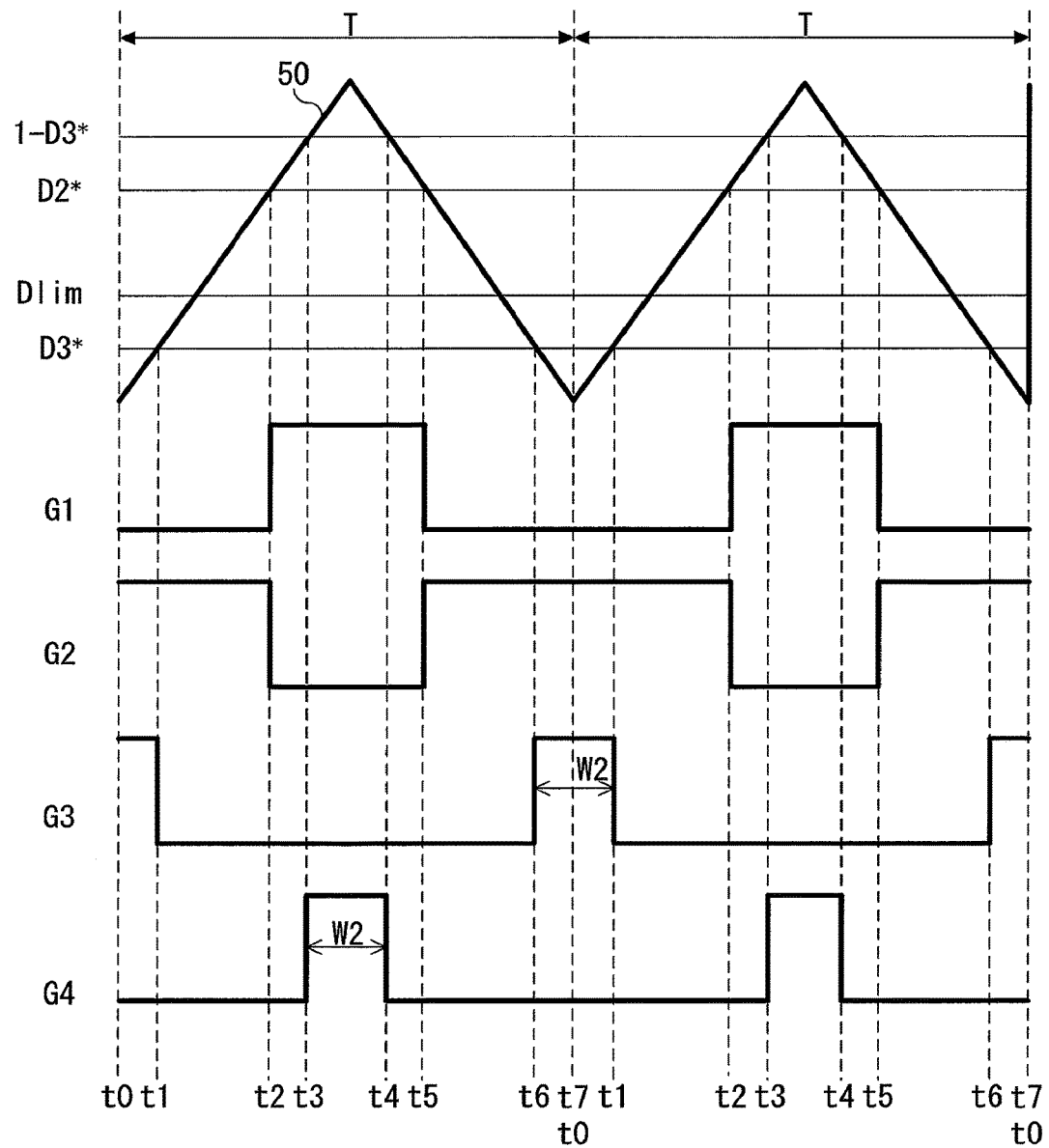
FIG. 16 is a waveform diagram for explaining generation of gate signals using a triangular wave in a power conversion device according to embodiment 2 of the present invention.

On the basis of FIG. 16 to FIG. 18, generation of the gate signals G1 to G4 for controlling the first to fourth switching elements 401 to 404 of the inverter circuit 4 in the present embodiment 2 will be described below. FIG. 16 is a waveform diagram for explaining generation of the gate signals G1 to G4, FIG. 17 is a control block diagram showing generation of the gate signals G1 and G2 for the first leg A, and FIG. 18 is a control block diagram showing generation of the gate signals G3 and G4 for the second leg B.

As shown in FIG. 16, the gate signals G1 to G4 are generated through PWM control using the duty commands for the first leg A and the second leg B, and the carrier wave. In this case, a triangular wave 50 is used as the carrier wave. D2* is used as the duty command for the first leg A, and D3* (=D4*) is used as the duty command for the second leg B. The triangular waves 50 used for generating the gate signals G1 to G4 are the same.

Figure 17:
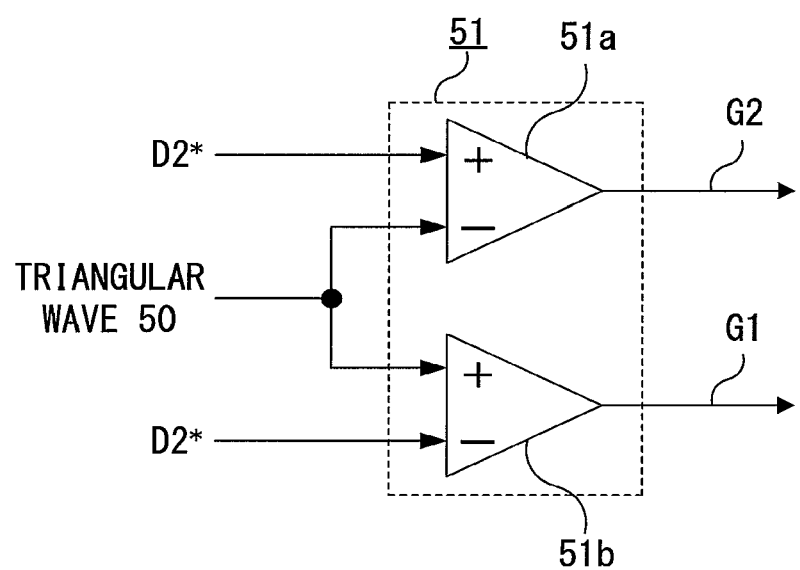
FIG. 17 is a control block diagram showing generation of gate signals for a first leg according to embodiment 2 of the present invention.
Figure 18:
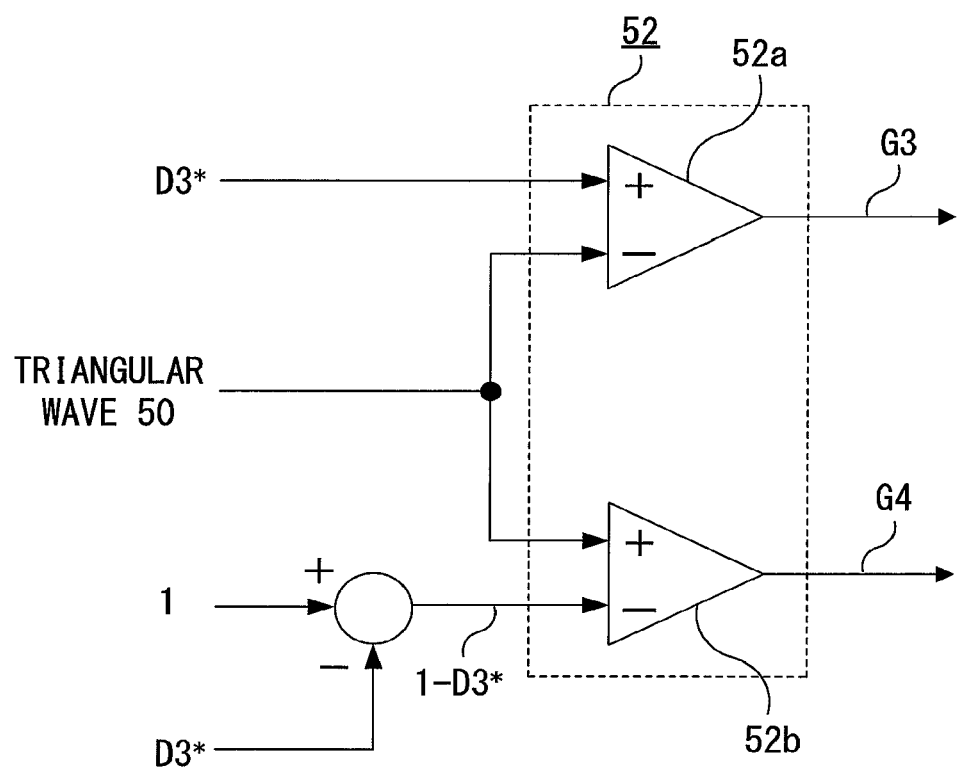
FIG. 18 is a control block diagram showing generation of gate signals for a second leg according to embodiment 2 of the present invention.

As shown in FIG. 17, a gate signal generator 51 for the first leg A includes two comparators 51a and 51b, each of which compares D2* and the triangular wave 50, thereby generating the gate signals G2 and G1.

During a period (t0 to t2, t5 to t7 (t0)) in which D2* is equal to or greater than the value of the triangular wave 50, the gate signal G2 becomes H and turns on the second switching element 402. During a period (t2 to t5) in which the value of the triangular wave 50 is equal to or greater than D2*, the gate signal G1 becomes H and turns on the first switching element 401.

As shown in FIG. 18, a gate signal generator 52 for the second leg B includes two comparators 52a and 52b. The comparator 52a compares D3* and the triangular wave 50, thereby generating the gate signal G3. During a period (t6 through t0 (t7) to t1) in which D3* is equal to or greater than the value of the triangular wave 50, the gate signal G3 becomes H and turns on the third switching element 403. The centers of gate signal pulses of the gate signals G2 and G3 are synchronized at the phase of the lower peak of the triangular wave 50.

The comparator 52b compares the triangular wave 50 and a duty command (1−D3*) which is a value obtained by subtracting D3* from 1, thereby generating the gate signal G4. During a period (t3 to t4) in which the triangular wave 50 is equal to or greater than (1−D3*), the gate signal G4 becomes H and turns on the fourth switching element 404. The gate signal pulses of the gate signals G3 and G4 have the same pulse width W2, and the ON periods of the third and fourth switching elements 403 and 404 have the same length. The centers of gate signal pulses of the gate signals G1 and G4 are synchronized at the phase of the upper peak of the triangular wave 50.

Also the power conversion device according to the present embodiment operates by the four types of operation modes described in the above embodiment 1. The power conversion device operates by the third mode during the period from t0 to t1, the fourth mode during the period from t1 to t2, the second mode during the period from t2 to t3, the first mode during the period from t3 to t4, the second mode during the period from t4 to t5, the fourth mode during the period from t5 to t6, and the third mode during the period from t6 to t7 (t0).

As described above, also in the present embodiment 2, for the first leg A, the duty cycles D1 and D2 are adjusted and PWM control is performed, thereby performing high power factor control for current iac flowing from the AC power supply 1 via the rectification circuit 2, and for the second leg B, the duty cycle D3 (D4) is adjusted to be a value equal to or smaller than the duty cycles D1 and D2, and PWM control is performed, thereby controlling voltage Vdc of the DC capacitor 5 and controlling power outputted to the secondary side of the isolation transformer 6. Thus, as in the above embodiment 1, the current control and the output power control can be achieved by one inverter circuit 4 having a full-bridge configuration, whereby the power conversion device can be simplified and downsized.

In addition, the triangular wave 50 is used as the carrier wave of PWM control for the first leg A and the second leg B, and the gate signals G1 to G4 are generated such that the center of a gate signal pulse for the first switching element 401 and the center of a gate signal pulse for the fourth switching element 404 are synchronized at the phase of the upper peak of the triangular wave 50, and the center of a gate signal pulse for the second switching element 402 and the center of a gate signal pulse for the third switching element 403 are synchronized at the phase of the lower peak of the triangular wave 50. Therefore, within the constraint condition due to the high power factor control, the duty cycle D3 (D4) for the second leg B can be freely adjusted, whereby the high power factor control and the output power control can be reliably achieved independently of each other, the quality of transmitted power is enhanced, and output control of the power conversion device with higher reliability can be achieved.

By using the triangular wave 50 as the carrier wave, the total period in the second mode and the fourth mode, i.e., the period in which power is not transmitted to the isolation transformer 6, is symmetric with respect to the peak phase of the triangular wave 50 in the drive cycle T. Therefore, the amount of current flowing through the fourth switching element 404 when the transformer current decreases in the second mode after current flows through the isolation transformer 6 in the first mode is equal to the amount of current flowing through the third switching element 403 when the transformer current decreases in the fourth mode after current flows through the isolation transformer 6 in the third mode. Thus, losses in the third and fourth switching elements 403 and 404 are equalized, the heat dissipation configuration can be simplified, and size reduction in the power conversion device can be facilitated.

It is noted that, within the scope of the present invention, the above embodiments may be freely combined with each other, or each of the above embodiments may be modified or abbreviated as appropriate.

The invention claimed is:

1. A power conversion device comprising:
   a rectification circuit having a plurality of diodes with a full-bridge configuration and rectifying input from an AC power supply;
   a reactor connected to a positive DC terminal of the rectification circuit;
   an inverter circuit in which a first leg having a first switching element and a second switching element connected in series to each other with a first connection point therebetween as a first AC end, a second leg having a third switching element and a fourth switching element connected in series to each other with a second connection point therebetween as a second AC end, and a DC capacitor are connected in parallel between DC buses, only the first AC end of the first and second AC ends being connected to the positive DC terminal of the rectification circuit, a negative one of the DC buses being connected to a negative DC terminal of the rectification circuit;
   an isolation transformer having a primary winding and a secondary winding, the first AC end and the second AC end of the inverter circuit being connected to respective ends of the primary winding; and
   a control circuit configured to perform output control of the inverter circuit, wherein the control circuit performs power factor control of circuit current flowing from the AC power supply via the rectification circuit, by PWM control for only the first leg of the first and second legs, and controls voltage of the DC capacitor by PWM control for the second leg using duty cycles of the third and fourth switching elements equal to or smaller than both duty cycles of the first and second switching elements in the first leg, thereby controlling power outputted to a secondary side of the isolation transformer, and the control circuit limits the duty cycles of the third switching element and the fourth switching element using, as an upper limit, a smaller one of the duty cycles of the first and second switching elements.

2. The power conversion device according to claim 1, further comprising:
a second rectification circuit connected to the secondary winding of the isolation transformer; and
a second reactor connected to a DC terminal of the second rectification circuit, wherein
the control circuit controls output power to a DC circuit connected to the second rectification circuit, by performing PWM control for the second leg.

3. The power conversion device according to claim 2, wherein the control circuit
performs PWM control for the first leg and the second leg with equal drive cycles synchronized with each other,
controls the first leg so that the circuit current becomes target sinewave current, and
controls the second leg so that the voltage of the DC capacitor becomes target voltage higher than peak voltage of the AC power supply.

4. The power conversion device according to claim 1, wherein the control circuit
performs PWM control for the first leg and the second leg with equal drive cycles synchronized with each other,
controls the first leg so that the circuit current becomes target sinewave current, and
controls the second leg so that the voltage of the DC capacitor becomes target voltage higher than peak voltage of the AC power supply.

5. The power conversion device according to claim 4, wherein the control circuit
controls the duty cycles of the third switching element and the fourth switching element to be equal to each other.

6. The power conversion device according to claim 5, wherein the control circuit
controls the second switching element so that ON and OFF thereof are inverted from those of the first switching element,
controls the fourth switching element which is diagonal with respect to the first switching element, so as to have an ON period only within an ON period of the first switching element, and
controls the third switching element which is diagonal with respect to the second switching element, so as to have an ON period only within an ON period of the second switching element.

7. The power conversion device according to claim 4, wherein the control circuit
controls the second switching element so that ON and OFF thereof are inverted from those of the first switching element,
controls the fourth switching element which is diagonal with respect to the first switching element, so as to have an ON period only within an ON period of the first switching element, and
controls the third switching element which is diagonal with respect to the second switching element, so as to have an ON period only within an ON period of the second switching element.

8. The power conversion device according to claim 7, wherein the control circuit
uses a saw-tooth wave as a carrier wave of PWM control for the first leg and the second leg,
synchronizes rising of a gate signal pulse for the first switching element and rising of a gate signal pulse for the fourth switching element, and
synchronizes rising of a gate signal pulse for the second switching element and rising of a gate signal pulse for the third switching element.

9. The power conversion device according to claim 7, wherein the control circuit
uses a triangular wave as a carrier wave of PWM control for the first leg and the second leg,
synchronizes a center of a gate signal pulse for the first switching element and a center of a gate signal pulse for the fourth switching element, and
synchronizes a center of a gate signal pulse for the second switching element and a center of a gate signal pulse for the third switching element.

10. The power conversion device according to claim 9, wherein the control circuit
generates a command value of a duty cycle for one element of the third and fourth switching elements,
generates the gate signal pulse for the one element by comparison between the command value of the duty cycle, and the triangular wave, and
generates the gate signal pulse for another element of the third and fourth switching elements by comparison between a value obtained by subtracting the command value of the duty cycle from 1, and the triangular wave.

\* \* \* \* \*